(No Model.)

A. F. HILYER.
EVAPORATOR FOR HOT AIR REGISTERS.

No. 438,159. Patented Oct. 14, 1890.

WITNESSES
T. W. Fowler
W. H. Patterson

INVENTOR
Andrew F. Hilyer,
by A. H. Evans & Co.
Attorneys

UNITED STATES PATENT OFFICE.

ANDREW F. HILYER, OF WASHINGTON, DISTRICT OF COLUMBIA.

EVAPORATOR FOR HOT-AIR REGISTERS.

SPECIFICATION forming part of Letters Patent No. 438,159, dated October 14, 1890.

Application filed January 7, 1890. Serial No. 336,132. (No model.)

*To all whom it may concern:*

Be it known that I, ANDREW F. HILYER, a citizen of the United States, residing at Washington city, District of Columbia, have invented certain new and useful Improvements in Evaporators for Hot-Air Registers, of which the following is a clear, full, and exact description, reference being had to the accompanying drawings, forming a part of this specification, in which—

Figure 1:
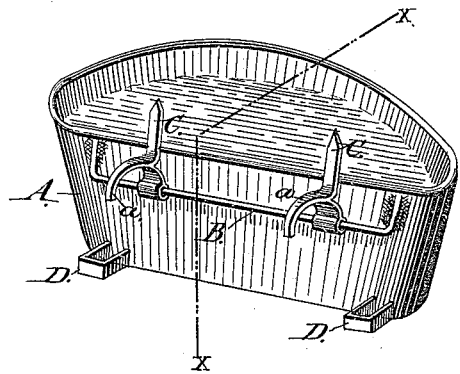
Figure 2:
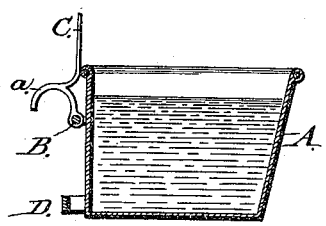

Figure 1 is a perspective view of my improved device. Fig. 2 is a cross-section on line X X in Fig. 1.

The object of my present invention is to readily supply the heated air of a room with a proper amount of moisture for health and comfort; and it consists of a combination of devices hereinafter explained and claimed.

To enable others skilled in the art to make and use my invention, I will now describe my invention and indicate the manner in which I carry the same out.

In the drawings, A represents a suitable tank to be supplied with water, and attached to the register by the hooks $a\,a$. These hooks are adjustably secured to the bar B, attached to the rear of the tank, and are provided with sharply-pointed pins C C, made integral therewith, which extend vertically above the frame of the tank for a double purpose. These pins are intended to catch and hold a cloth, which may be thrown over the tank with the view of drawing the water from the tank by capillary attraction, and thereby securing a greater amount of evaporation. The pins C C also serve as handles by which the tank can be lifted when desired.

To prevent the tank from swinging forward when hooked to the register, I place the stops D D on the rear of the tank and near its bottom, by which means the tank is always adjusted to a level when in use.

It is evident that by this construction I am enabled to attach my evaporator near the top of the register, where it will receive the greatest amount of heat, and by means of a cloth hung on the pins C C, with the corners of it in the water, the water by means of capillary attraction will soon supply the whole cloth with fluid for evaporation. The wet cloth will also catch the dust that comes from the register.

Having thus described my invention, what I claim as new, and desire to secure by Letters Patent, is—

The combination, with the tank having a rod upon its rear side and stops on said side near the bottom thereof, of hooks journaled upon said rod and having extensions whose upper ends are pointed, substantially as herein described.

ANDREW F. HILYER.

Witnesses:
 EDWARD P. HARRINGTON,
 H. L. ERSKINE.